US009098594B2

(12) United States Patent
Ogievetsky

(10) Patent No.: US 9,098,594 B2
(45) Date of Patent: Aug. 4, 2015

(54) METRIC PORTAL

(75) Inventor: Nikita Ogievetsky, Woodmere, NY (US)

(73) Assignee: MORGAN STANLEY SMITH BARNEY HOLDINGS LLC, Purchase, NY (US)

(*) Notice: Subject to any disclaimer, the term of this patent is extended or adjusted under 35 U.S.C. 154(b) by 1910 days.

(21) Appl. No.: 11/966,288

(22) Filed: Dec. 28, 2007

(65) Prior Publication Data

US 2009/0172518 A1  Jul. 2, 2009

(51) Int. Cl.
G06F 17/00 (2006.01)
G06F 17/30 (2006.01)

(52) U.S. Cl.
CPC .............................. G06F 17/30893 (2013.01)

(58) Field of Classification Search
CPC ................................................ G06F 17/30893
USPC .................................................... 715/234
See application file for complete search history.

(56) References Cited

U.S. PATENT DOCUMENTS

| | | | |
|---|---|---|---|
| 7,774,378 B2 * | 8/2010 | Nelson | 707/803 |
| 8,271,892 B2 * | 9/2012 | Duncker et al. | 715/765 |
| 2002/0183936 A1 * | 12/2002 | Kulp et al. | 702/19 |
| 2003/0078830 A1 * | 4/2003 | Wagner et al. | 705/10 |
| 2004/0117222 A1 * | 6/2004 | Rokosz et al. | 705/7 |
| 2007/0198331 A1 * | 8/2007 | Hurley et al. | 705/11 |

OTHER PUBLICATIONS

Moraga, M. A., Calero, C., & Piattini, M. (2006). Comparing different quality models for portals. Online Information Review, 30, 555-568.*

Nikita Ogievetsky and Vladimir Rodyguin, "Building Adaptive Classificators with Topic Maps and XSLT," presented at XML '00 Conference, Dec. 6, 2000, printed from http://cogx.com/?si=urn:cogx:resource:classificator on Mar. 18, 2008.

Nikita Ogievetsky, "Cogitative Technologies > XWATL," printed from http://cogx.com/?si=urn:cogx:ps:xwatl on Mar. 18, 2008, p. 1-2.

(Continued)

*Primary Examiner* — Amelia Tapp
(74) *Attorney, Agent, or Firm* — K&L Gates LLP

(57) ABSTRACT

Various aspects are directed to a computer system for implementing an interface for presenting metric data to a user, the computer system may comprise a storage medium, which may, in turn, comprise a sitemap. The sitemap may define an organization of portal pages and wherein each portal page comprises at least one region defining a metric data type and a metric data presentation. The computer system may also comprise at least one processor configured to implement a controller unit. The controller unit may be configured to query a data source to retrieve a first data collection, where the first data collection comprises metric data of a first business context. The controller unit may also be configured to render a first portal page selected from the organization of portal pages according to the first data collection. In response to a request for a portal page change, the controller unit may be configured to render a second portal page selected from the organization of portal pages according to the first data collection. Also, in response to a request for a business context change, the controller unit may be configured to query the data source for a second data collection comprising metric data of a second business context; and render the second portal page according to the second data collection.

7 Claims, 16 Drawing Sheets

(56) References Cited

OTHER PUBLICATIONS

Nikita Ogievetsky, "Cogitative Technologies > Cogitative Topic Map Websites," printed from http://cogx.com/?si=urn:cogx:ps:ctw on Mar. 18, 2008, p. 1-2.

Nikita Ogievetsky, "Data Maintenance on the Web Made Easy with XML Templates," presented at XML '99 Conference, Dec. 6, 1999, printed from http://cogx.com/?si=urn:cogx:resource:dmxwatl on Mar. 18, 2008, p. 1-33.

Nikita Ogievetsky, "HTML Form Templates with XML, All in One and One for All, XSLT template library for Web applications," presented at Metastructures '99, Aug. 6, 1999, printed from http://cogx.com/?si=urn:cogx:resource:htmlft on Mar. 18, 2008, p. 1-26.

Nikita Ogievetsky & Rodger Sperberg, "Content Repurposing With Topic Maps," presented Aug. 5, 2003, printed from http://cogx.com/?si=urn:cogx:ps:ctw on Mar. 18, 2008, p. 1-16.

Nikita Ogievetsky, "Cogitative Topic maps Websites (CTW) Framework. Information and tutorial," printed from http://cogx.com/cogx/ctw/ on Mar. 18, 2008, p. 1-4.

Nikita Ogievetsky, "Dynamic Web Sites with Topic Maps and XSLT," presented at Extreme Markup Languages 2000 Conference, Aug. 17, 2000, printed from http://cogx.com/?si=urn:cogx:resource:tmwsites on Mar. 18, 2008, p. 1-42.

\* cited by examiner

METRIC PORTAL

BACKGROUND

The present disclosure relates to portal interfaces for aggregating and presenting information to a user.

FIGURES

Embodiments of the present invention are described herein, by way of example, in conjunction with the following figures, wherein:

FIG. 6 illustrates the example portal page of FIG. 5 after a local context preview on the organization structure dimension;

FIG. 10 illustrates an example portal page from one embodiment of the business metric portal;

FIG. 11 illustrates one embodiment of the example portal page of FIG. 10 after a local context preview along the asset type dimension;

DESCRIPTION

Various embodiments are directed to a business metric portal for aggregating and presenting metric data to a user. Metric data may be any kind of descriptive data describing an entity (e.g., a person, a business or political organization, etc.) engaged in any kind of business or other endeavor. Many of the example embodiments described herein are configured to aggregate and present metric data related to a retail brokerage firm. It will be appreciated, however, that various embodiments may include portals for aggregating and presenting metric data describing other types of entities engaged in other types of endeavors instead of or in addition to that describing a retail brokerage firm.

The business metric portal may comprise a combination of topical (e.g., portal pages) and contextual (e.g., business context) aspects that may be independently navigable. In addition, the business metric portal may simultaneously support multiple display platforms including, for example, different types of internet browsers, personal digital assistants (PDA's), mobile phones, etc. These and other features described herein may simplify maintainability, enforce performance, increase the navigability and findability of data within the interface. Also, these features may make it faster and simpler to modify the business metric portal to handle and display business metrics from new areas, as described herein below. According to various embodiments, the topical, contextual, data retrieval, presentational and navigational aspects of the portal may be implemented as a series of independent layers.

Figure 1:
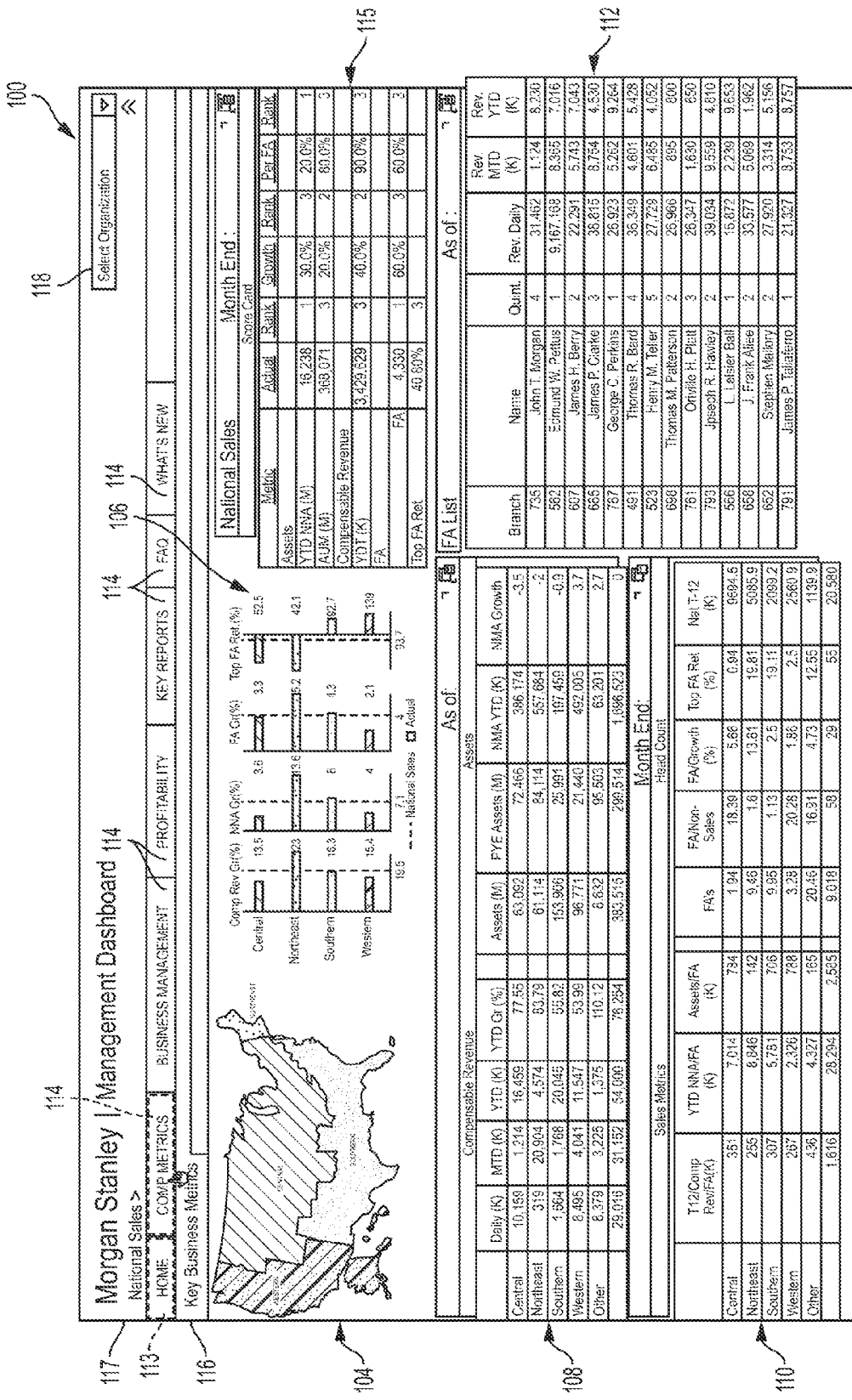
FIG. 1 illustrates an example portal page from one embodiment of a business metric portal.

According to various embodiments, a business metric portal may comprise a plurality of topical portal pages for defining spatial and other presentational aspects for metric data. The portal pages may be populated with metric data related to a common business topic (e.g., Key Business Metrics, Asset Mix, Profitability, etc.). FIG. 1 illustrates an example portal page 100 from one embodiment of a business metric portal configured for use by a retail brokerage firm. The page 100 is directed to the topic, Key Business Metrics, and comprises a plurality of spatially arranged regions 104, 106, 108, 110, 112, 115. Each of the regions or portlets may define a metric data type or types and a presentation form. For example, in region 104, the metric data type is sales data by geographic area and the presentation form is a map. In region 106, the metric data types are compensable revenue growth percentage, assets under management growth percentage attributed to net new assets, Financial Advisor (FA) population growth percentage; and top FA retention, all by geographic area. The presentation form is a series of charts. Regions 108, 110, 112 and 114 all show various metric data types in the form of a series of grids.

Figure 5:
FIG. 5 illustrates an example portal page from one embodiment of the business metric portal.
Figure 10:
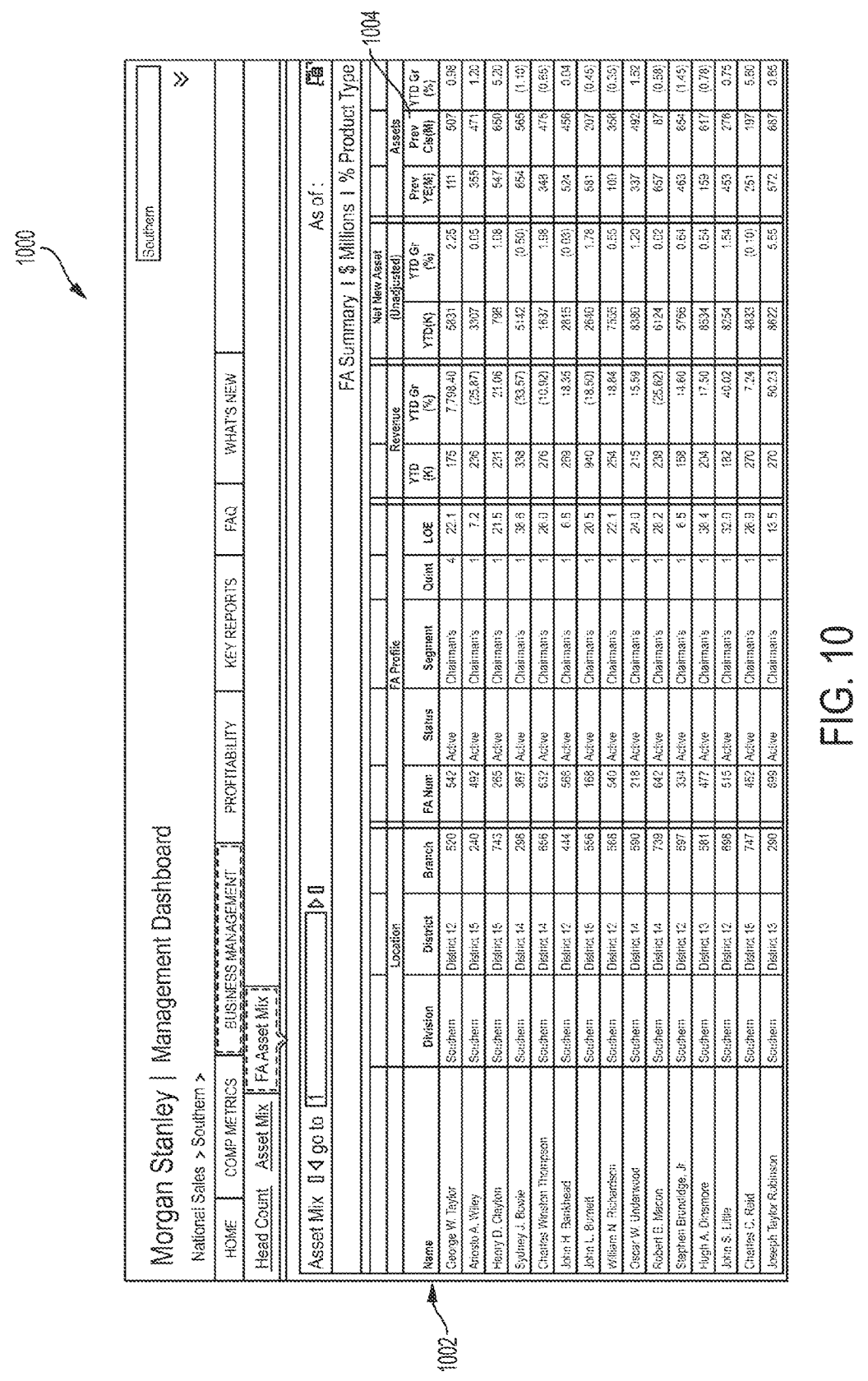
Figure 12:
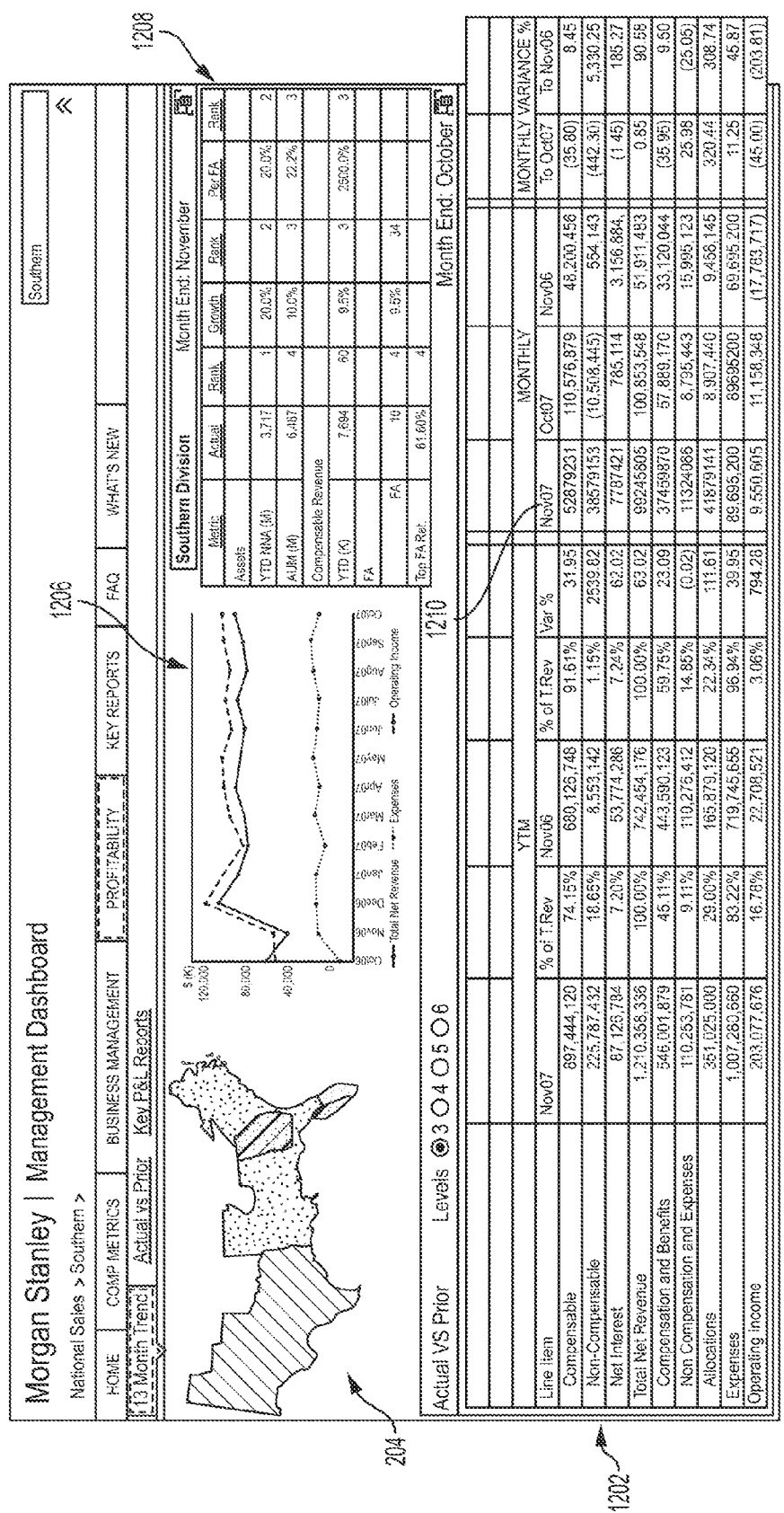
FIG. 12 illustrates another example portal page from one embodiment of the business metric portal.

Different portal pages within the business metric portal may include metric data directed to different topics and in different presentations. For example, different pages may be tailored to the needs of different people and/or different tasks regarding the entity. As described above, the page 100 is directed to Key Business Metrics and presented in an arrangement that may be useful to personnel monitoring an entity, or organizational unit thereof, at a high level of generality. FIG. 5 illustrates an example portal page 500 from one embodiment of the business metric portal. The page 500 is directed to Asset Mix and includes a region 502 showing metric data related to different asset types on the vertical axis and different product/account types on the horizontal axis. Accordingly, the page 500 may be useful to personnel managing asset mixes over different account types handled by the entity. FIG. 10 illustrates an example portal page 1000 from one embodiment of the business metric portal. The page 1000 is directed to Financial Advisor Asset Mix and shows asset mix by financial advisor, which may be useful to a manager of financial advisors. FIG. 12 illustrates another example portal page 1200 from one embodiment of the business metric portal. The page 1200 is directed to a 13 month profitability trend may is shown to display metric data relating to profitability.

Figure 2:
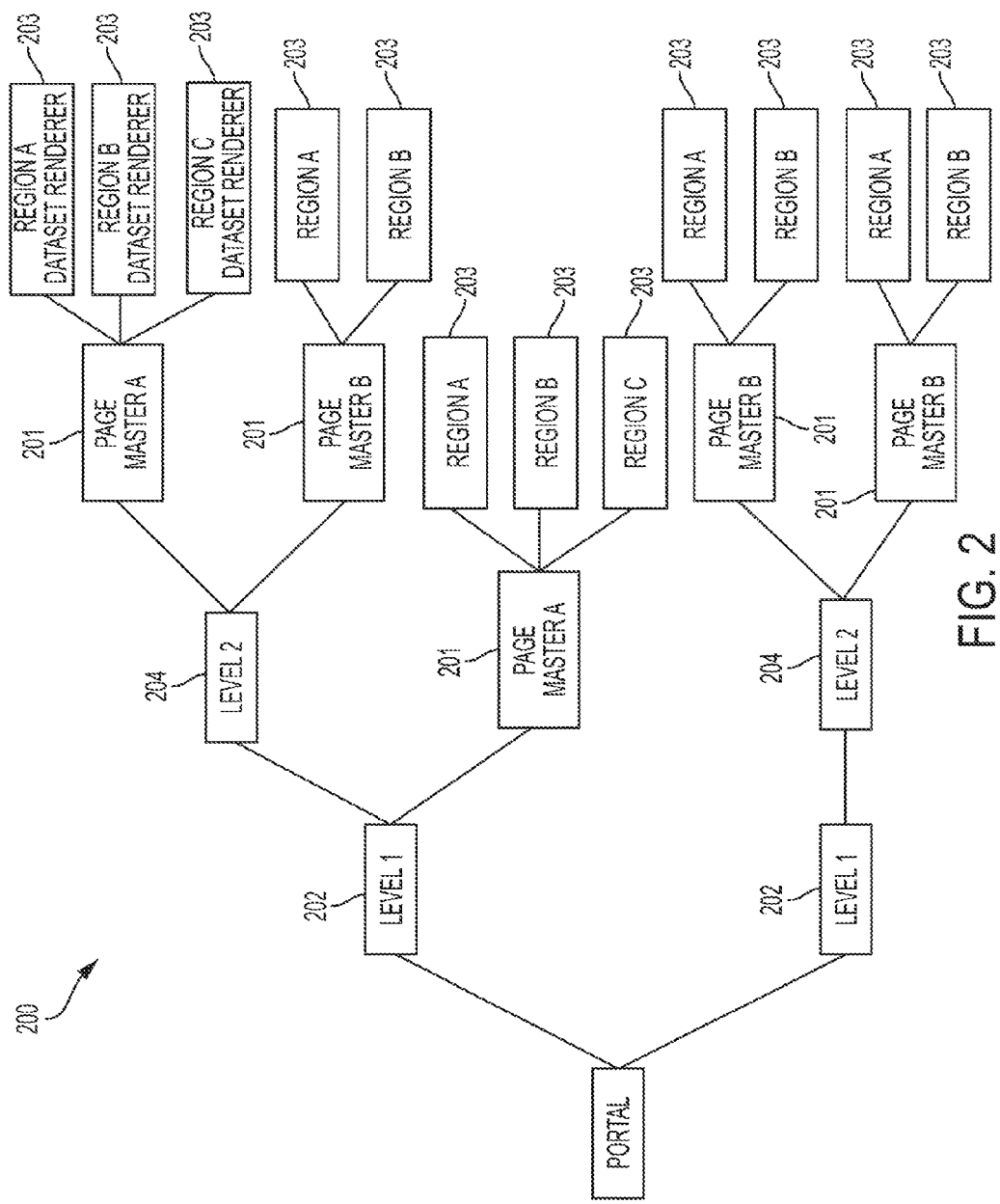
FIG. 2 illustrates one embodiment of a sample hierarchal organization of pages within a business metric portal.

According to various embodiments, portal pages within the business metric portal may be organized according to any suitable organization or taxonomy. For example, FIG. 2 illustrates one embodiment of a sample hierarchal organization 200 of portal pages within a business metric portal. Each of the portal pages 201 may be positioned at one of the levels 202, 204 of the hierarchy 200. The hierarchy 200 or other organization of pages may be stored, for example, as a sitemap, as described herein below. Although only two levels 202, 204 are shown in FIG. 2, it will be appreciated that the hierarchy 200 may include as many or as few levels as desired. The hierarchy 200 shown in FIG. 2 may be topical. For example, pages 201 configured to present metric data related to similar topics may be classified under a common branch of the hierarchy 200.

The various portal pages 201 may include one or more regions 203 (e.g., such as regions 104, 106, 108, 112, 115 of the page 100). Each region 203 may be associated with a dataset and a renderer. The dataset may be a collection of data of the metric data type to be displayed in the region 203. The renderer may be a utility that renders the dataset according to the specified presentation form for viewing by a user. The dataset may include data of a particular metric data type, for example, determined by the topic of the page 201. The renderer may define a presentation form for the dataset. The datasets necessary to render all of the regions in a given page 201 may be referred to as a data collection.

In addition to being categorized topically (e.g., according to portal page), metric data may also be categorized by business context. Business context may be independent of business topic (e.g., portal page). A particular business context may be described by its position in a multidimensional taxonomy of business context axes, with each axis corresponding to a dimension of metric data. For example, metric data describing an entity may be classified across multiple dimensions. One example dimension may represent the organization structure of the entity with values corresponding to different organizational units. Other example dimensions may represent different product types, financial instrument types, employee/laborer types, etc. Some or all of the metric data may also be expressed in terms of a time dimension. An individual unit of metric data may be referenced across multiple dimensions. For example, one unit of metric data for a retail brokerage firm may describe the revenue of a given organizational unit of the firm from a particular product type, on a given day. Another example unit of metric data may describe the revenue generated by a particular financial advisor over a given quarter for a given type of security.

Figure 3:
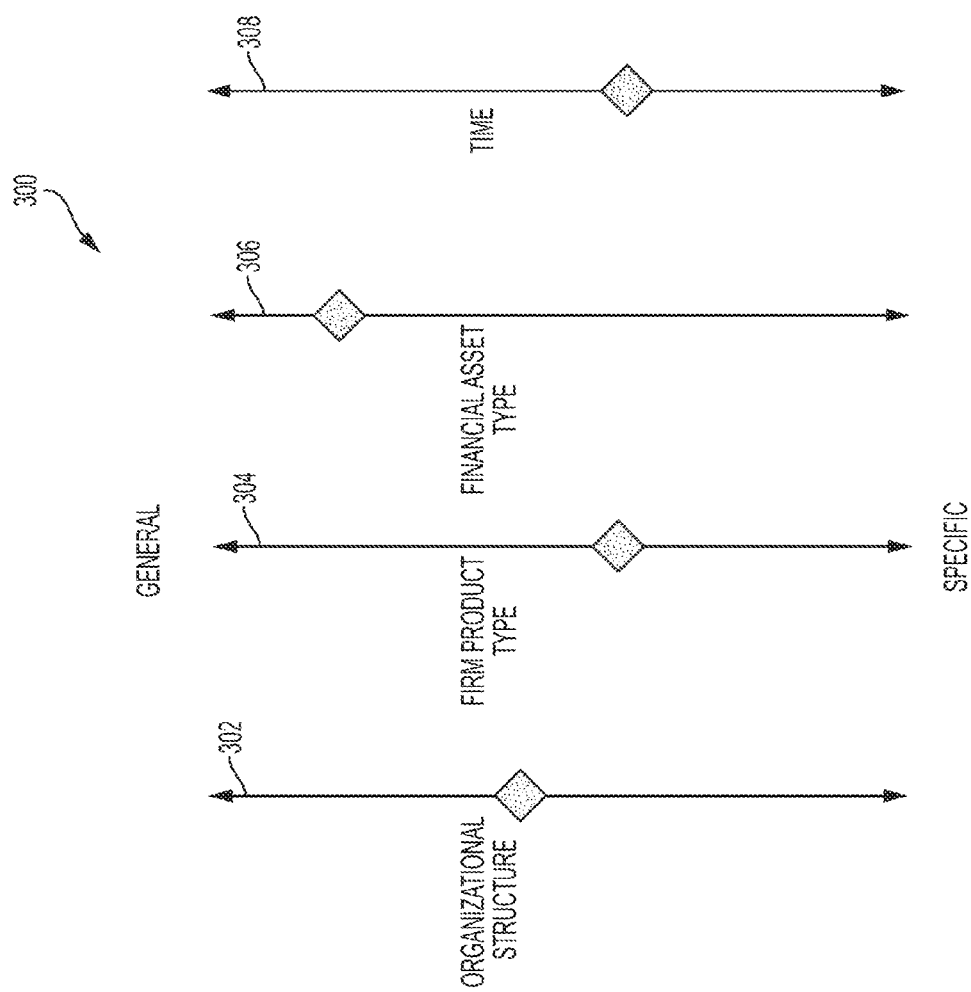
FIG. 3 is a chart illustrating one embodiment of a set of example metric dimensions for a retail brokerage firm.

FIG. 3 is a chart 300 illustrating one embodiment of a set of example metric axes 302, 304, 306, 308 for a retail brokerage firm. An organizational structure axis 302 may represent organizational units of the firm and may be arranged from general to specific. For example, the highest level of the organizational structure axis 302 may represent the entirety of the firm, while the lowest level may include the smallest independently describable unit within the firm (e.g., branch offices, financial advisors, other employees, etc.). A firm product type axis 304 may be arranged from general to specific and may include classifications of different products marketed by the firm (e.g., fee per transaction accounts, accounts with fees based on assets under management, etc.). A financial asset type axis 306 may also be arranged from general to specific and may include classifications of different instruments, securities, etc., that are generally available. A time axis 308 may be organized chronologically.

A business context may be represented by a value, or range of values, for each axis 302, 304, 306 308. If an additional axis or axes are included, values for the additional axes may be required as well. Referring back to FIG. 1, the page 100 is shown populated with metric data of a context where the organizational structure axis 302 is set at the national level of the firm; the firm product type axis 304 is set to all product types; the asset type axis 306 is set to all assets and the time dimension is set to show metric data describing the previous month. Although four dimensions are shown in FIG. 3, it will be appreciated that fewer or more dimensions may be desirable. For example, additional dimensions for metric data describing a retail brokerage firm may include a client dimension, a geographic dimension, an assets under management dimension, etc.

According to various embodiments, the business metric portal may be configured to allow a user to independently navigate between portal pages representing business topics (e.g., topical navigation) and between business contexts (e.g., contextual navigation). To allow navigation between portal pages, each page may include navigation features (e.g., links, tabs, buttons, etc.) allowing a user to choose a desired page. For example, the portal page 100 includes navigation tabs 113, 114, 116. Selecting one of the tabs 113, 114, 116 may cause the business metric portal to display a new page which may be at the same level or a different level of the hierarchy 200 as the previously displayed page. In various embodiments, each classification of the tabs 113, 114, 116 may correspond to a different level of the hierarchy 200. For example, the tab 113 may cause the business metric portal to display a root level of the hierarchy 200, while tabs 114 and 116 may similarly correspond to other hierarchy levels.

In addition to navigating between portal pages, the business metric portal may allow the user to navigate between business contexts. Navigating between business contexts may occur independently of navigation between portal pages or topics. For example, changing a business context may change the metric data displayed within a given portal page, but may not otherwise change the page organization, page layout and presentation of metric data. Each different business context, however, may yield metric data having different values on the various axes 302, 304, 306, 308.

In various embodiments, a user of the business metric portal may access metric data of a different dimension in any suitable manner. For example, the user may perform a local context preview or exploration, which may cause the interface to display a subset of metric data from a new context in addition to data from a current context. Also, for example, the user may perform a global context change. This may cause all of the datasets of the various regions and portal pages within the interface to be replaced with new datasets according to the new business context. This may change most or all of the metric data displayed by the various portal pages.

Global context navigation may be facilitated according to any suitable mechanism. For example, referring to FIG. 1, the portal page 100 may allow a user to navigate to a new global business context utilizing any one of a breadcrumb path 117, a drop down menu 118, and/or any of the charts and grids shown at regions 104, 106, 108, 110, 112, 115. For example, the user may select a new value or range of values for the organizational structure axis 302 from the drop down menu 118. Other embodiments may include various other drop-down menus (not shown) corresponding to various other context axes. Also, the user may select an indication of a more specific value of a metric dimension from one of the regions 104, 106, 108, 110, 112, 115 to drill to that value. For example, the user may select an organizational unit from any of the regions, an asset type from region 108, a sales metric from region 110, etc. Also, a global context change may be initiated from the region of a portal page where metrics from different business contexts have already been previewed. The user may select a representation of a previewed metric shown in a portal page to bring about a global context change to the context of the selected metric.

Figure 4:
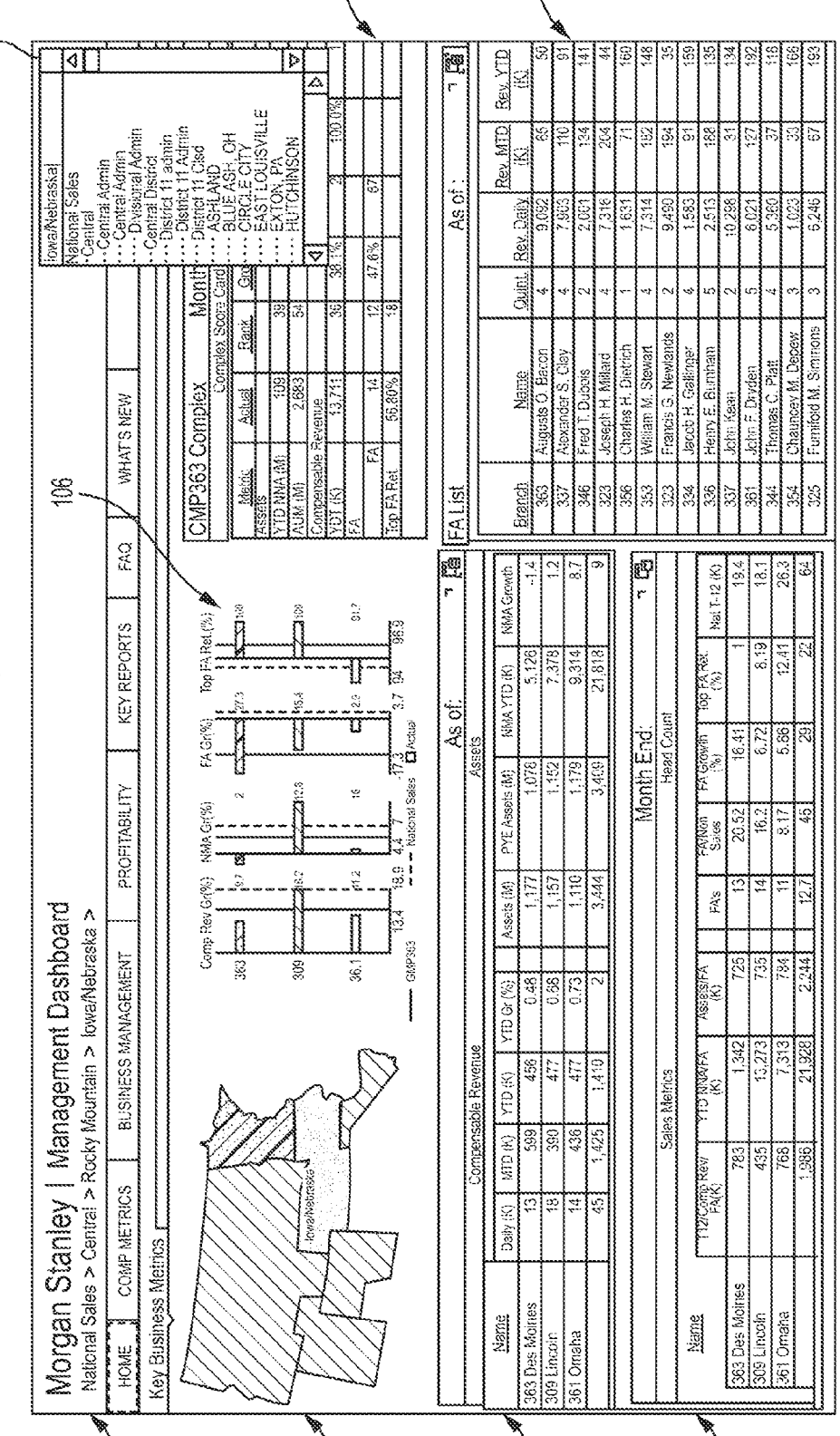
FIG. 4 illustrates one embodiment of the example portal page of FIG. 1 after a global context change along the organizational structure dimension.

FIG. 4 illustrates one embodiment of the portal page 100 at a different global business context than is shown in FIG. 1 (e.g., the value of the organizational structure axis 302 has been set to Iowa/Nebraska). In FIG. 4, the portal page 100 comprises the same or similar regions 104, 106, 108, 110, 112, 115 as shown in FIG. 1, however, the dataset for each region has been modified along the organization structure axis 302 to display metric data relating to the Iowa/Nebraska portion of the entity or firm rather than the national level, as shown in FIG. 1. From the portal page 100 as shown in FIG. 4, the user may navigate up or down along the organizational structure axis 302 or any other context axis. For example, the user may drill up to a higher level of the organizational structure axis 302 by selecting a more general value from the breadcrumb path 117 or dropdown menu 118. The user may drill further down, for example, by selecting a more specific value along any dimension from one of the regions 104, 106, 108, 110, 112, 115.

Figure 6:
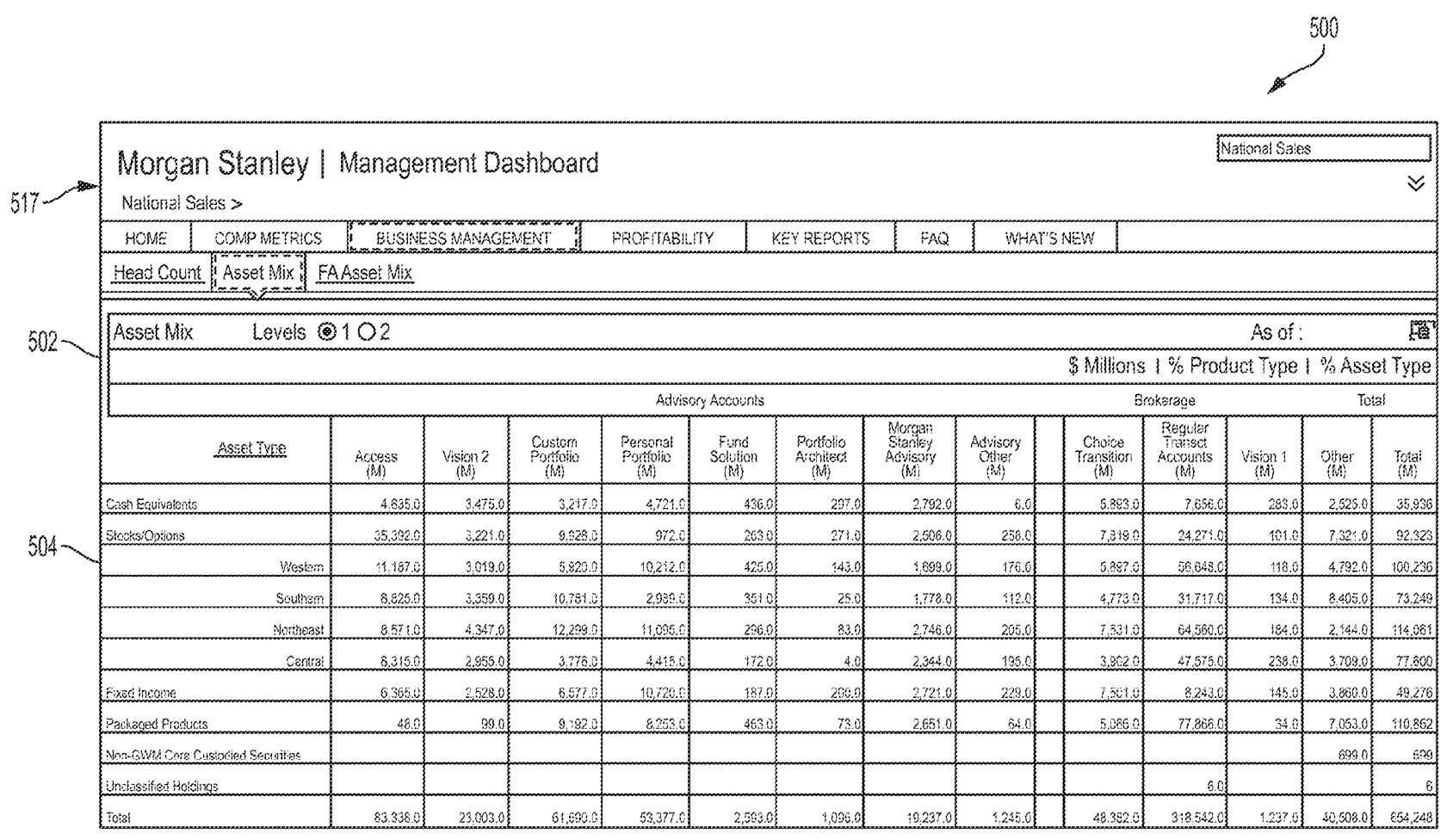
Figure 7:
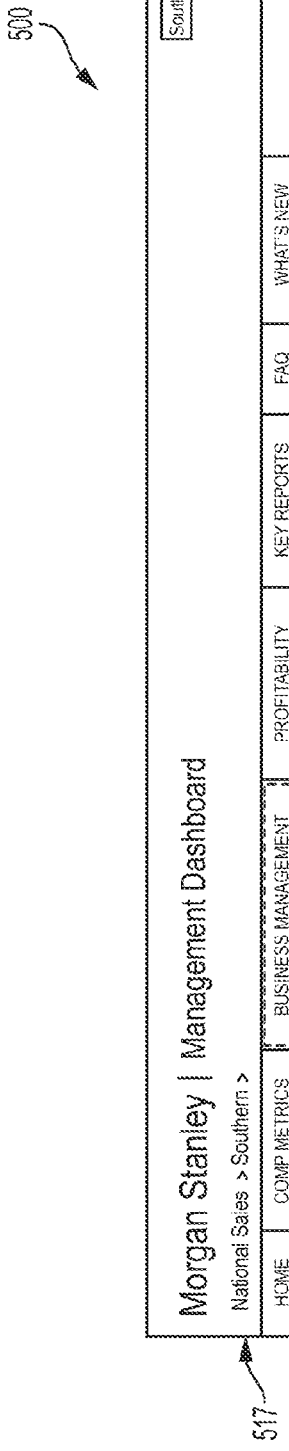
FIG. 7 illustrates the example portal page of FIG. 5 after a global context change along the organizational structure dimension.

Like a global context navigation or change, a local context preview may also be facilitated according to any suitable mechanism. For example, the portal page 500 shown in FIG. 5 illustrates a region 502 showing a grid of asset type by account or product type. In FIG. 5, the page 500 is shown at a most general on the organization structure axis 302 (e.g., national sales). A user may preview metric data values for more specific organizational units on the organizational structure axis 302 by selecting one of the asset types from the region 502 (e.g., Stocks/Options asset type 504). FIG. 6 illustrates the portal page 500 including the local context preview on the organization structure axis 302. When Stocks/Options asset type 504 is selected for a local context preview, as shown, metric data relating to Stocks/Options may be broken down across the set of more specific organization units. For example, as shown in FIG. 6, metric data relating to the selected Asset type is displayed broken down between the Western, Southern, Northeast and Central organizational units. This may serve as a preview of the metric data that would be displayed if a global context change to one of these regions was performed. From this preview, the user may select one of the displayed organizational units to perform a global context change, as illustrated by FIG. 7. FIG. 7 illustrates the portal page 500 after a global context change along the organizational structure axis 302. For example, in FIG. 7, the page 500 is shown with metric data values according to a context relating to a Southern organizational unit of the firm. This is reflected by the breadcrumb path 517 shown in FIG. 7. It will be appreciated that the global context change resulting in the page 500 as shown in FIG. 7 may be performed from the page 500 as shown in FIG. 6 as well as from the page 500 as shown in FIG. 5.

Figure 8:
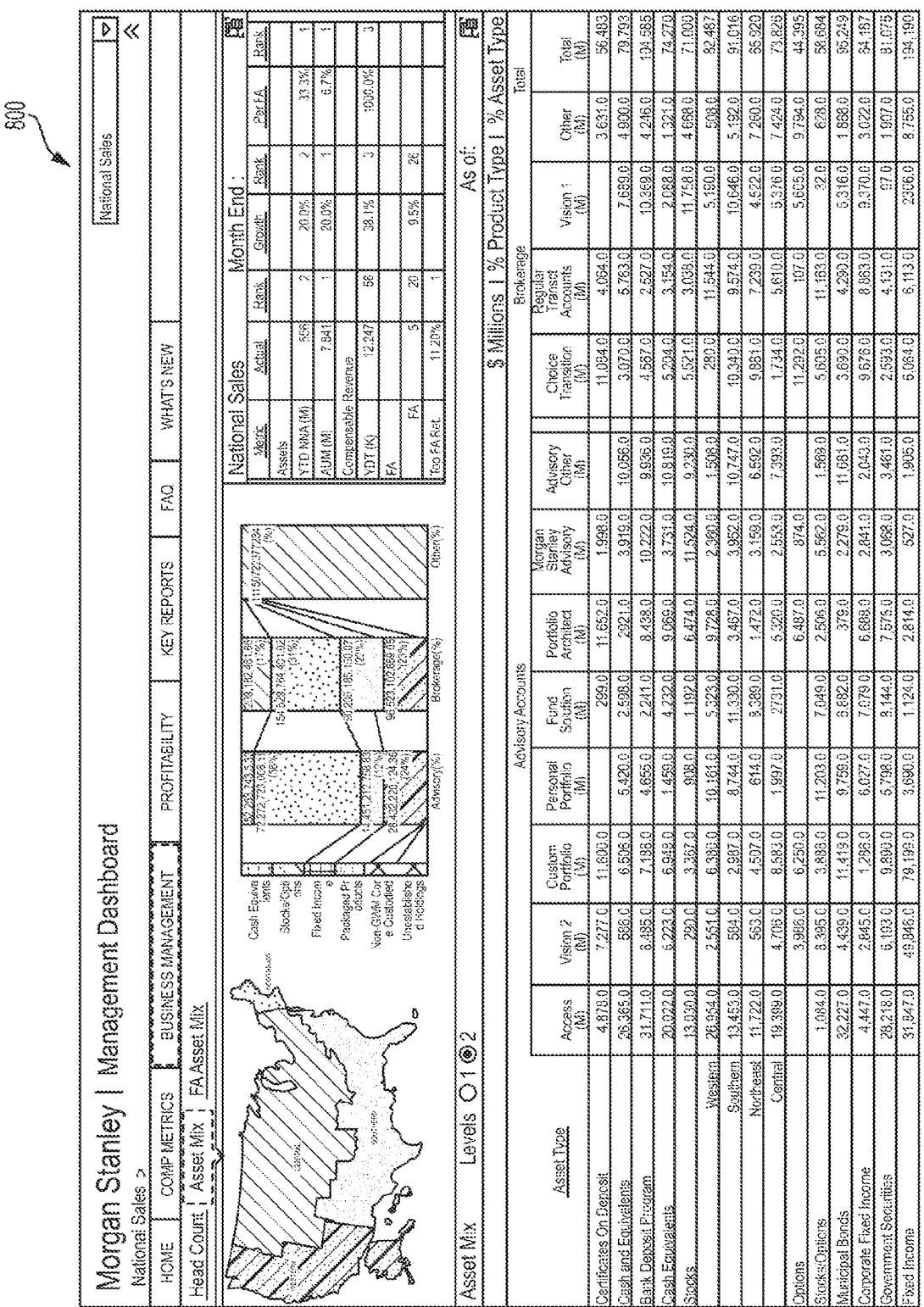
FIGS. 8 and 9 illustrate one embodiment of an example portal page demonstrating another example of a local context preview and a global context change along the organizational structure dimension.
Figure 9:
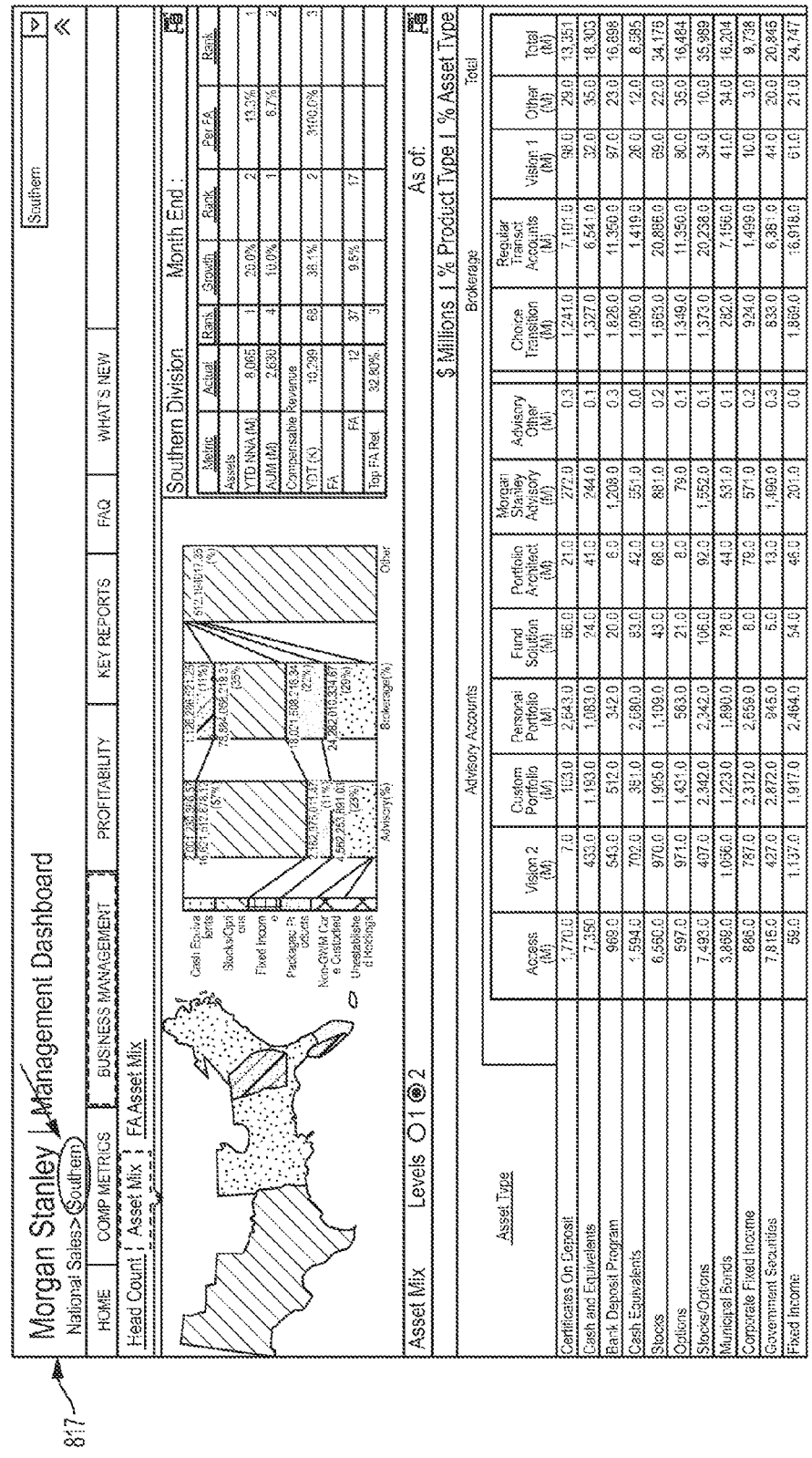

FIGS. 8 and 9 illustrate one embodiment of an example portal page 800 demonstrating another example of a local context preview and a global context change along the organizational structure axis 302. As shown in FIG. 8, the page 800 already illustrates a local business context preview along the organizational structure axis 302 from the National Sales level to the next most specific level, illustrating metric data for Stocks relating to the Western, Southern, Northeast and Central regions 802. In FIG. 9, a global context change along the organizational structure axis 302 has occurred. As shown in FIG. 9, the organizational structure axis 302 has a value corresponding to the Southern organization unit of the firm or entity.

Figure 11:
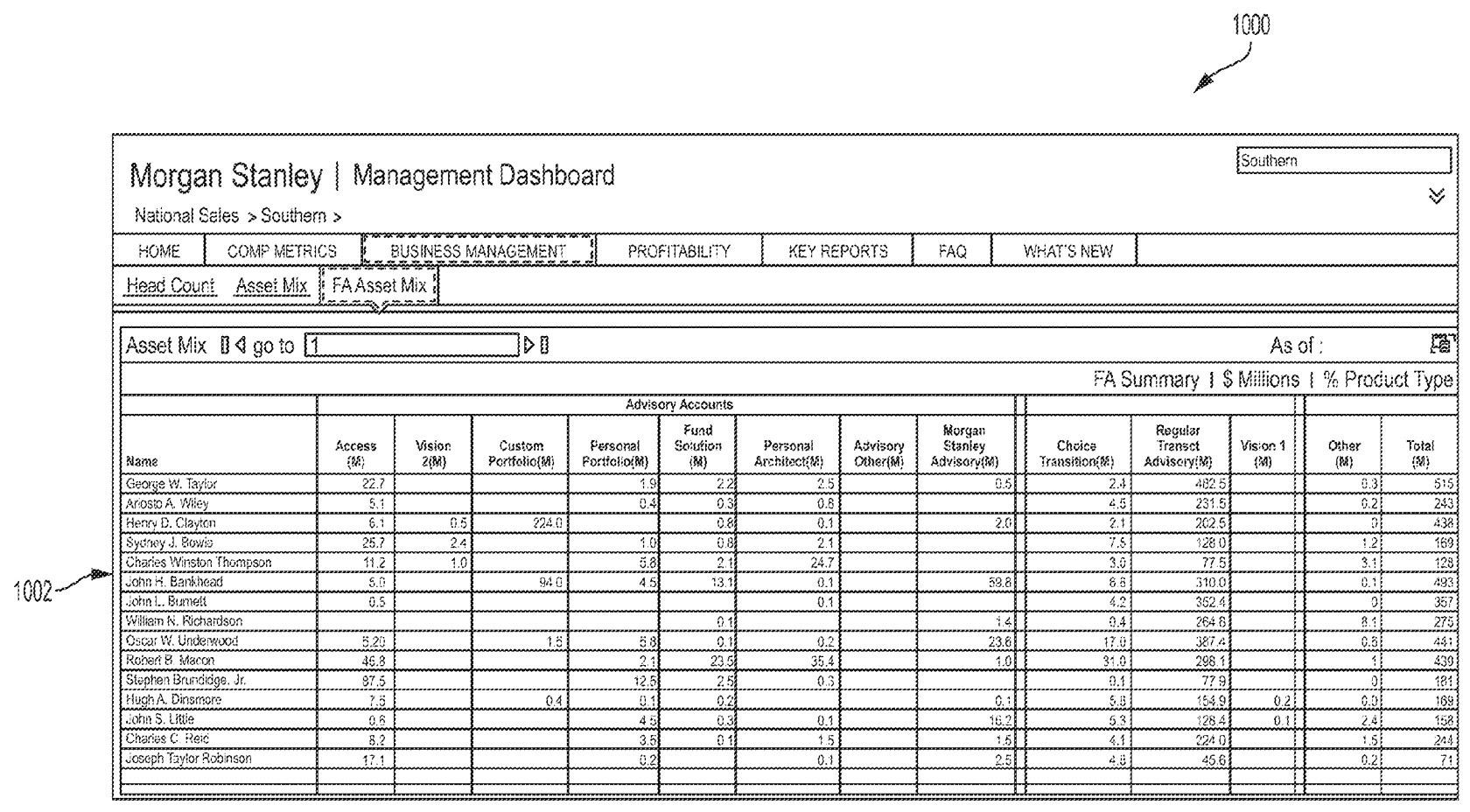

FIGS. 10 and 11 illustrate one embodiment of an example portal page 1000 demonstrating a local business context preview along the asset type axis 306. The page 1000 comprises a region 1002 showing metric data by financial analyst across various different dimensions (e.g., location, FA profile, Revenue, Net New Assets, Assets, etc.). The user may perform a local business context preview along the asset axis 306 by selecting, for example, assets as of the previous day's close 1004. The results of such a local context preview are shown in FIG. 11. In FIG. 11, the region 1002 has been reconfigured to show metric data across various categories of the asset value, assets as of the previous day's close 1004.

Figure 13:
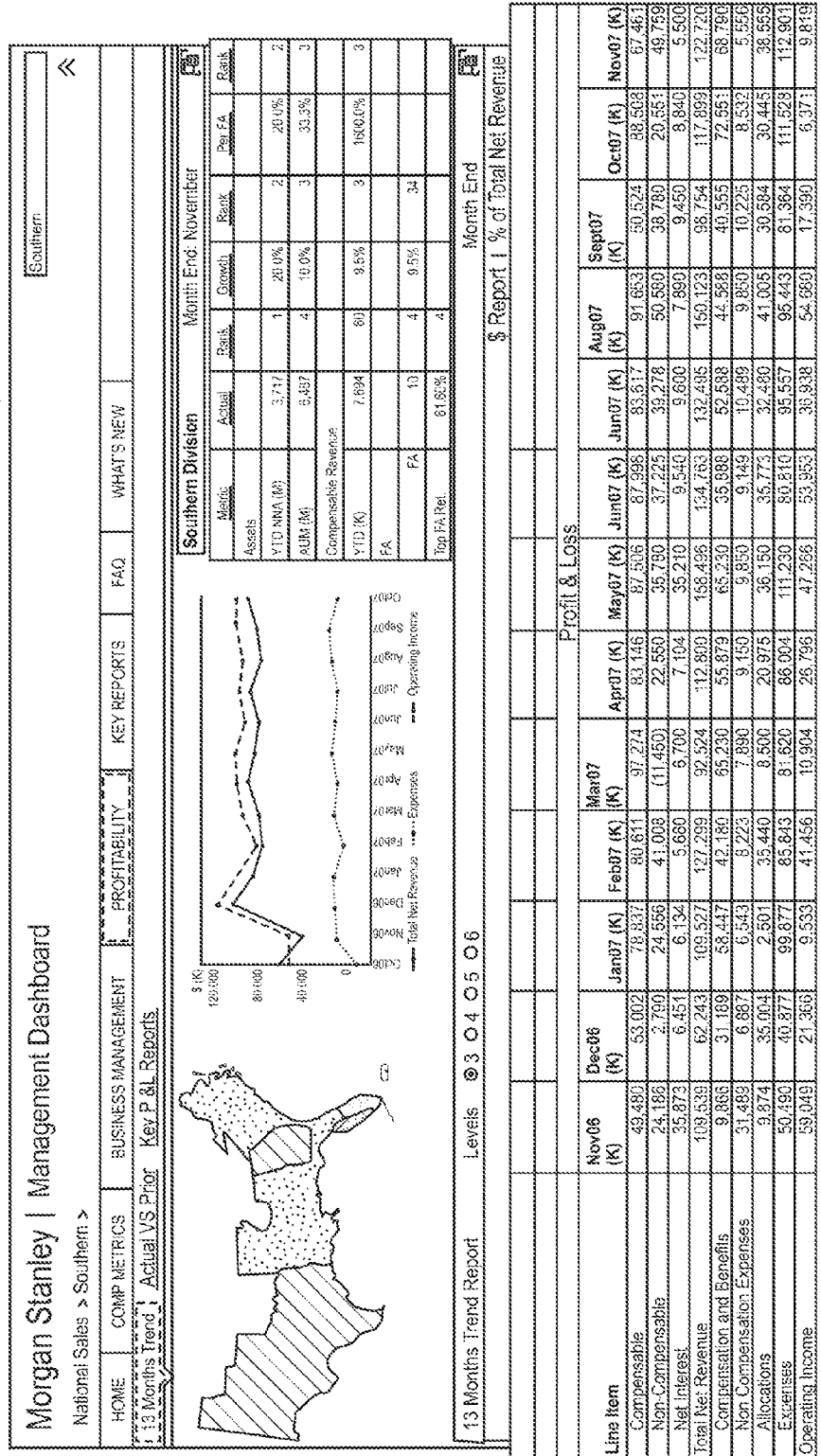
FIG. 13 illustrates one embodiment of the example portal page of FIG. 12 after a local context preview along the time dimension.

FIGS. 12 and 13 illustrate one embodiment of an example portal page 1200 demonstrating a business context preview along the time axis 308. The page 1200 includes regions 1202, 1204, 1206 and 1208. Region 1202 is configured to display metric data relating to profit and loss. As shown in FIG. 12, the context of the metric data displayed at the region 1202 is set to a year-to-year and month-to-month comparison level. Selecting the current month (e.g., at 1210) may cause a local business context preview along the time dimension, resulting in a display of the same metric data in a monthly format, for example, as shown in FIG. 13.

Figure 14:
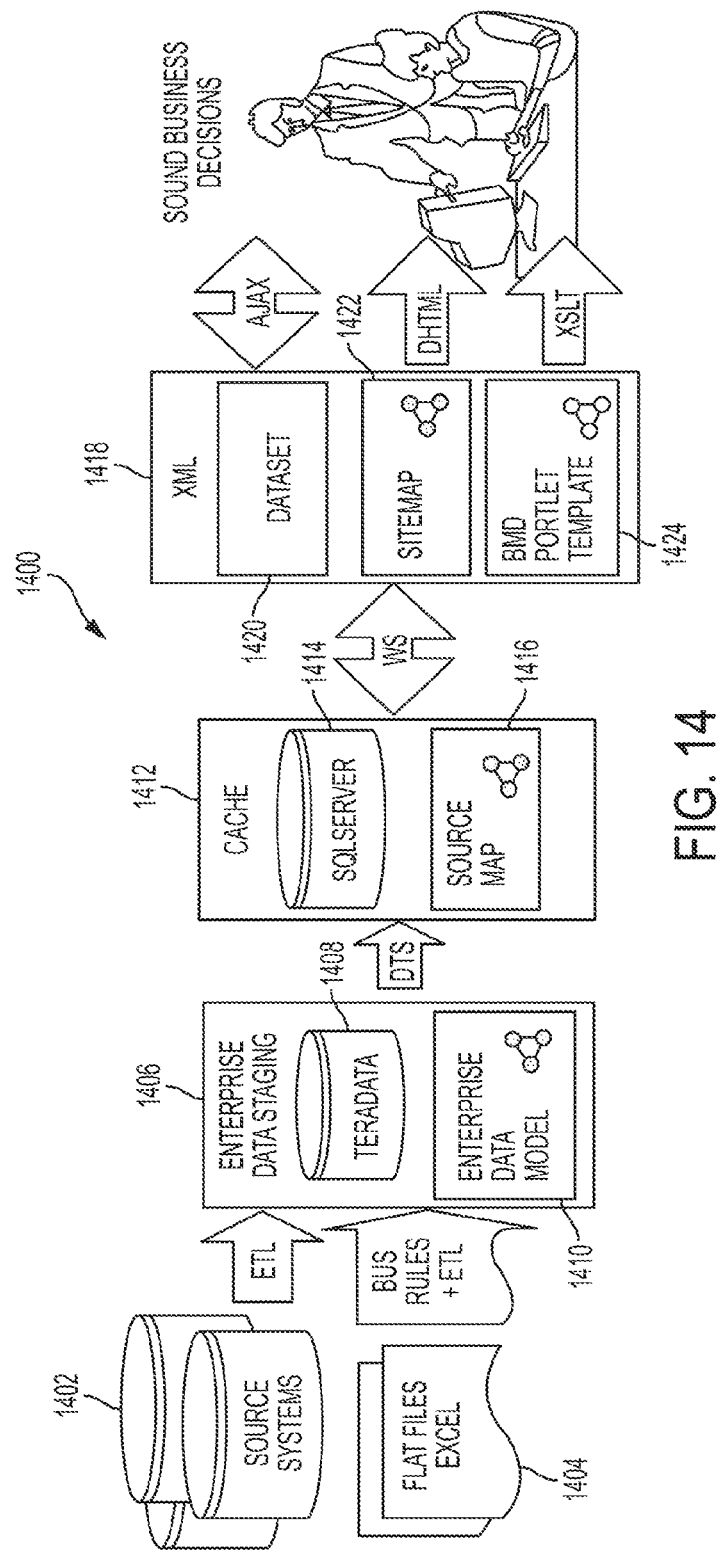
FIG. 14 illustrates one embodiment of a work flow for generating and presenting a business metric portal.

FIG. 14 illustrates one embodiment of a work flow 1400 for generating and presenting a business metric portal. An enterprise data staging unit 1406 may be utilized to receive, aggregate and stage metric data received from source systems 1402 and flat files 1404. For example, pre-verified data may be received from source systems 1402. Source systems 1402 may include any suitable system including, for example, records systems of the firm such as Assets, Revenues, Net New Assets, etc. Any suitable tool may be used to extract data from the source systems 1402 including, for example, any kind of extract, transform, load (ETL) tool. Flat data files 1404 may be received directly from users, for example, in a MICROSOFT EXCEL spreadsheet or other format (e.g., a sequentially accessible format). Flat files 1404 may also be loaded by any suitable tool including, for example, an ETL tool. Additionally, the business logic and data integrity of flat files 1404 received from users may be automatically verified before being uploaded to the enterprise data staging unit 1406. For example, the flat files 1404 may be subjected to business rules (e.g., to verify internal consistency).

The enterprise data staging unit 1406 may comprise one or more databases 1408 and an enterprise data model 1410. The database 1408 may be any suitable kind of database for storing metric data received from the source systems 1402 and flat files 1404 (e.g., a relational database). The enterprise data model 1410 may be a software component providing a schema for organizing the metric data. According to various embodiments, the enterprise data staging unit 1406 may receive all or a large portion of the metric data necessary to implement the business metric portal.

A dashboard cache unit 1412 may be utilized to prepare and cache metric data elements that are within the scope of the business metric portal (e.g., some or all of the metric data elements that are permitted to appear in the active version of the business metric portal). The dashboard cache unit 1412 may comprise a storage unit 1414, which may be a SQL server, and a dashboard source map 1416. The storage unit 1414 may be utilized to store data for the business metric portal. The source map 1416 may be a map of the various metrics described in human understandable terms. For example, the source map 1416 may allow a user to build new reports and charts at run time, as described hereinbelow. Data may be loaded from the enterprise data staging unit 1406 to the dashboard cache unit 1412 utilizing any suitable tool including, for example, a DATA TRANSFORMATION SERVICES tool available from MICROSOFT. To prepare the data, the dashboard cache unit 1412 may optimize the data for rendition. For example, specific data elements required by one or more visual elements of the interface may be aggregated.

The business metric portal front end 1418 may comprise front-end tools for retrieving, rendering and providing metric data to the user. According to various embodiments, the business metric portal front end 1418 may be executed by a local machine of the user, which may be, for example, a desktop computer, a laptop computer, a personal digital assistant (PDA), a palmtop computer, a mobile phone, or any other suitable type of computing device. The front end 1418 may include a dashboard sitemap 1422, which may define the hierarchy of pages. Portlet templates, such as the portlet template 1424 shown, may define the type and presentation of metric data within a region or portlet. Dataset 1420 may be transferred from the cache unit 1412 to the front end 1418 utilizing a Web Service (e.g., Simple Object Access Protocol (SOAP), Representational State Transfer (REST), etc.) or any other suitable protocol. According to various embodiments, the datasets 1420 for each page region may be cached at the user's machine and may include the set of metric data related to a selected metric data context. A common collection of datasets 1420 may be utilized to render multiple pages within a the same context. When the user selects a new global business context, the front end 1418 may query the dashboard cache 1412 for new datasets related to the new context.

When a new portal page is selected, metric data included in the dataset 1420 may be rendered to generate the different portlets or regions making up the displayed portal page. Various protocols and/or software tools may be used to render a region or regions making up a page for display. For example, sitemaps 1422, portlet templates, 1424 and data 1420 may be expressed in Extensible Markup Language (XML), JAVASCRIPT Object Notation (JSON) or any other suitable format. The front end 1418 may utilize any suitable rendering and/or display technology to utilize the sitemap 1422, portlet templates 1424 and data 1420 to render a portal page 102. For example, any sort of renderer including, for example, an Extensible Stylesheet Language Transformations (XSLT) renderer, JAVASCRIPT-driven renderer, or other suitable renderer may be utilized to render visual elements of a portal page, for example, in a Scalable Vector Graphics (SVG), Extensible Application Markup Language (XAML), FLASH, Hypertext Markup Language (HTML), or any other suitable format. Also, navigation between different portal pages and contexts may be driven utilizing any suitable client side scripting mechanisms and/or languages including, for example, Asynchronous JAVASCRIPT and XML (AJAX), Dynamic Hypertext Mark Up Language (DHTML), any FLASH active script, etc. According to various embodiments, common standards may be utilized to render and facilitate navigation within the business metric portal to achieve multi-platform support. Example standards that may be used include, XML, XSLT, SVG, JAVA, ECMASCRIPT, JAVASCRIPT, ACTIONSCRIPT, C#, JAVA, etc.

Figure 15:
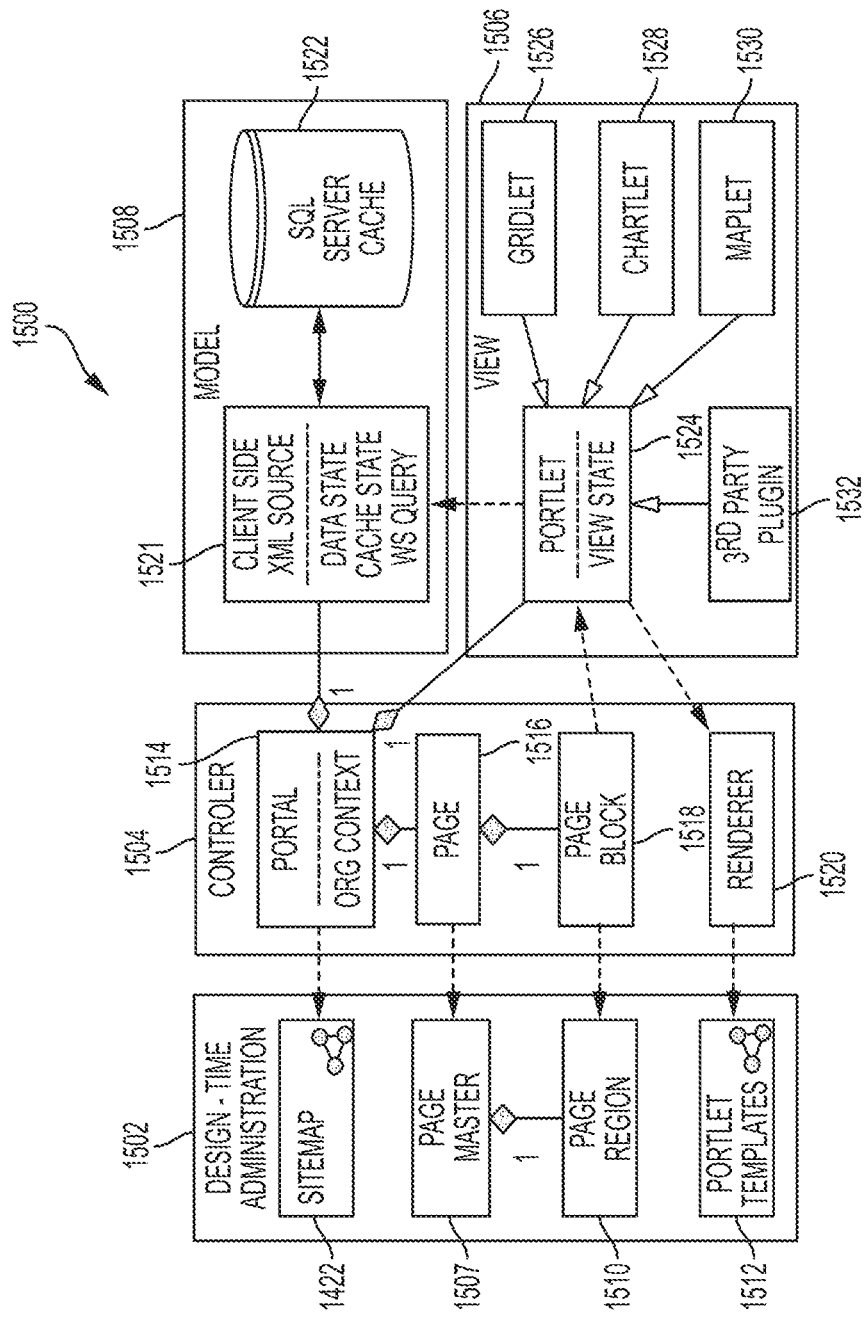
FIG. 15 illustrates a system level diagram of one embodiment of a business metric portal.

FIG. 15 illustrates a system level diagram of one embodiment of a business metric portal 1500. The interface 1500 may comprise a design time administration module 1502, a controller module 1504, a view module 1506 and a model module 1508. The design time administration module 1502 may be stored at any suitable storage medium and may include components whose form is determined at design time. The components of the module 1502 may be later used to populate and display portal pages of the interface 1500. According to various embodiments, the interface 1500 may comprise a tool (not shown) allowing a user to modify the site map at run time, as described below.

The sitemap 1422, as described above, may define the organization of portal pages. Each page in the sitemap 1422 may include a page master 1507, which may define one or more page regions 1510 making up the corresponding page. According to various embodiments, the design time administration module 1502 may include multiple distinct sitemaps 1422. Each distinct sitemap 1422 may be tailored to a particular type of user machine. For example, one sitemap may include pages and regions configured for use with an Internet browser on a Personal Computer (PC), while other sitemaps may be configured for use with personal digital assistants (PDA's), mobile phones, palmtop computers, etc. For example, a sitemap configured for use with a mobile phone may include page masters designed to be displayed on smaller screen than those of a sitemap configured for use with an Internet browser.

The controller module 1504 may include the run time components that may control navigation to generate the view 1506 displayed to the user. Portal 1514 may define the view 1506 including various regions or portlets 1524 and their corresponding datasets 1521. The portal 1514 may include a page generator 1516, which may in turn comprise page block generators 1518, with one generator 1518 corresponding to each region or portlet of the page.

When a request is received to display a given portal page according to a given context, the portal 1514 may determine whether a dataset corresponding to the desired context is cached on the user's machine. If not, a query may be made to the model 1508 to retrieve a new dataset 1521. When the correct data set is verified, the portal 1514 may access the page generator 1516 corresponding to desired page. The page generator 1516 may, in turn, access the page block generators 1518 corresponding to the regions of the desired page. The portal controller 1504, may then utilize the renderer 1520 to render the page according to the datasets 1521 for each of its portlets. The result may be the view 1506 displayed to the user. The view 1506 may include various portlets 1524 corresponding to the different regions of the displayed page. Example portlets may include grids 1526, charts 1528 and maps 1530, as described above with respect to the page 100, as well as third party plug-ins 1532 such as, for example, FLASH applications or JAVA applets.

When a user requests a change to a new portal page, with no change in context, the portal 1514 may facilitate the rendering of the new page as described above without the need to query new datasets 1521 from the model 1508. When a local business context preview is requested, the portal 1514 may facilitate a re-rendering of the displayed page according to modified page block generators 1518 and page regions 1510 to reflect the additional dimensional data. The additional data itself may be retrieved from the model with a supplementary query. When a global context change is requested, the portal 1514 may query the model 1508 for a new dataset corresponding to the new context, and then re-render the displayed portal page according to the same page block generators 1518 and page regions 1510. According to various embodiments, when a new dataset is requested, the portal 1514 may compare the cached dataset with the new dataset and query the model 1508 only for portions of the new dataset that are not also included in the cached dataset.

According to various embodiments, the business metric portal described herein may support various levels of entitlements. For example, user entitlements may be defined by portal page. Referring to FIG. 2, any given user may be entitled to view pages at a particular level 202, 204 or branch of the hierarchy. For example, the firm may desire to limit certain employees access to various metric data types, e.g., based on job responsibilities. In addition, user entitlements may also be defined by context. The contexts of metric data available to users in any portal page may be limited. For example, a manager of a local office in Florida may not be entitled to view metric data relating to another local office in California.

According to various embodiments, the interface 1500 may be modified by a user at run-time, or at design time. For example, at design time, a user may customize the organization of portal pages defined by the site map 1422. For example, the user may modify the presentation or spatial layout of any of the page regions 1510. In addition, the user may add new pages directed to new topics by defining a new page master 1507 and page regions 1510. According to various embodiments, the interface 1500 may also include a utility (not shown) allowing a user to make similar modifications to the sitemap 1422 and pages 1507 at runtime. User entitlement may define the degree to which any particular user is permitted to modify a site map 1422. For example, standard users may customize, as described above, within their topical (e.g., portal pages) and contextual (e.g., business contexts) entitlement boundaries. Other users (e.g., administrators, power users, etc.) may have greater entitlements allowing them to modify default sitemaps as well the entitlements of other users.

Figure 16:
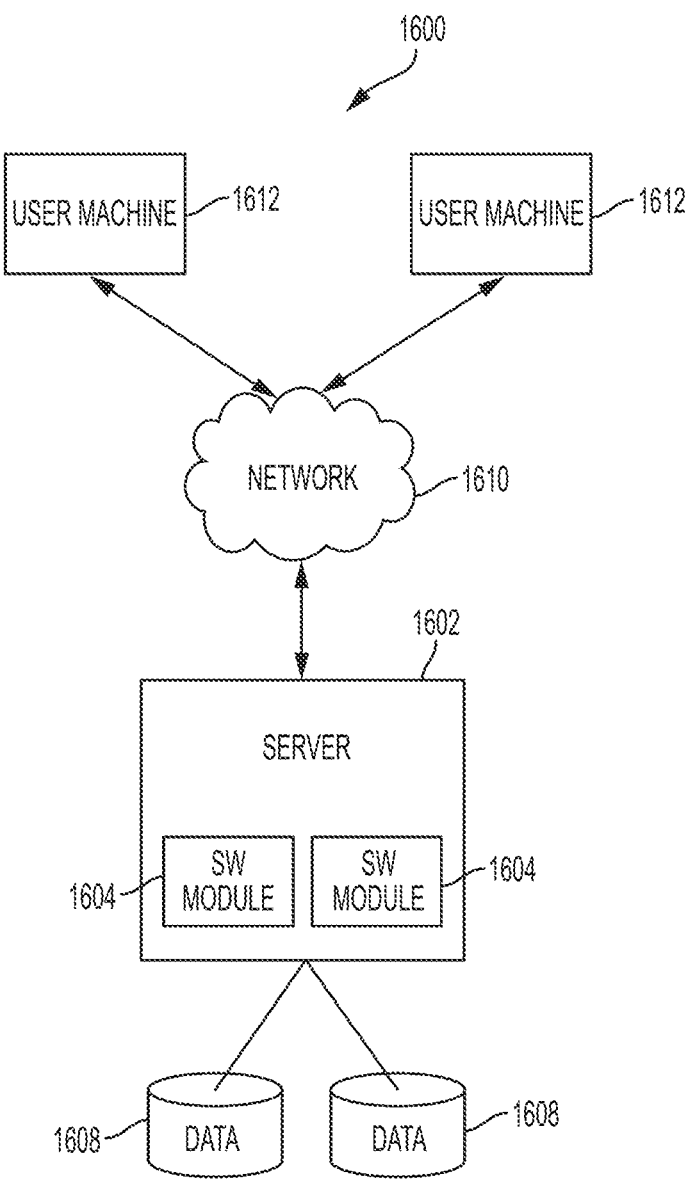
FIG. 16 illustrates one embodiment of a computer system for implementing the business metric portal.

FIG. 16 illustrates a computer system 1600 that may be used, according to various embodiments, to implement the business metric portal. The system 1600 may include one or more servers 1602 which may implement all or a portion of the workflow 1400 and/or the interface 1500 as described above. The server 1602 may implement one or more software modules 1604 which may implement, for example, the controller 1504 and/or other components of the business metric portal. According to various embodiments, one or more of the software modules 1604 may be implemented by a user machine 1612 in addition to, or instead of being implemented by the server 1602. The server 1602 may be in communication with one or more data stores 1608, which may store various data and components for implementing the business metric portal including, for example, the data model 1508, the design-time administration unit 1502, etc. The server 1602 may be in communication with one or more user machines 1612 via a network 1610. The various views and portal pages of the interface may be displayed on the user machines 1612. The user machines 1612 may be any type of computer including, for example, a personal computer (PC), a palmtop computer, a mobile phone, a personal digital assistant (PDA), etc.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention.

I claim:

1. A computer system for implementing an interface for presenting metric data to a user, the computer system comprising:
a storage medium comprising a sitemap, wherein the sitemap defines an organization of portal pages and wherein each portal page comprises at least one region defining a metric data type and a metric data presentation;
at least one processor configured to implement a controller unit, the controller unit configured to:
query a data source to retrieve a first data collection, wherein the first data collection comprises metric data of a first business context, wherein the first business context is defined by values for a plurality of context dimensions, and wherein the values for the plurality of context dimensions indicate a degree of specificity of the first business context in each dimension;
render a first portal page selected from the organization of portal pages according to the first data collection, wherein rendering the first portal page comprises populating a first region of the first portal page with data from the first data collection corresponding to the metric data type and the metric data presentation defined by the first region of the first portal page;
in response to a request for a portal page change, render a second portal page selected from the organization of portal pages according to the first data collection, wherein rendering the second portal page comprises populating a first region of the second portal page with data from the first data collection corresponding to the metric data type and the metric data presentation defined by the first region of the second portal page; and
in response to a request for a business context change:
query the data source for a second data collection comprising metric data of a second business context, wherein the second business context has a different value than the first business context for at least one of the plurality of context dimensions; and
render the second portal page according to the second data collection, wherein rendering the second portal page according to the second data collection comprises populating the first region of the second portal page with data from the second data collection corresponding to the metric data type and the metric data presentation defined by the first region of the second portal page.

2. The computer system of claim 1, wherein the controller unit is further configured to query the data source for a supplement to the first data collection, and render at least one region of the second portal page according to the first data collection and the supplement, in response to a request for a local business context preview.

3. The computer system of claim 1, wherein the at least one region comprises at least one metric data presentation form selected from the group consisting of a grid form, a chart form and a geographical map form.

4. The computer system of claim 1, wherein rendering the first portal page further comprises rendering utilizing an Extensible Stylesheet Language Transformations (XSLT) format.

5. The computer system of claim 1, wherein the plurality of context dimensions comprise a time dimension, a business organization dimension, and a product type dimension.

6. A computer-implemented method for presenting metric data to a user, the method comprising:
- selecting, by a computer system, a first portal page from an organization of portal pages, wherein the first portal page comprises at least one region defining a metric data type and a metric data presentation, wherein the computer system comprises at least one processor in communication with a memory;
- rendering the first portal page, by the computer system, according to a first data collection, wherein the first data collection comprises metric data of a first business context, wherein the first business context is defined by values for a plurality of context dimensions, and wherein the values for the plurality of context dimensions indicate a degree of specificity of the first business context in each dimension, and wherein rendering the first portal page comprises populating a first region of the first portal page with data from the first data collection corresponding to the metric data type and the metric data presentation defined by the first region of the first portal page;
- rendering, by the computer system, the first portal page according to the first data collection and a supplemental data collection, wherein the supplemental data collection comprises data of a second business context; and
- rendering, by the computer system, the first portal page according to a second data collection, wherein the second data collection comprises metric data of the second business context, wherein the second business context has a different value than the first business context for at least one of the plurality of context dimensions, and wherein rendering the first portal page comprises populating the first region of the first portal page with data from the first data collection corresponding to the metric data type and the metric data presentation defined by the first region of the first portal page.

7. The method of claim 6, further comprising:
- rendering a second portal page selected from the organization of portal pages according to the first data collection;
- rendering the second portal page according to the first data collection and the supplemental data collection; and
- rendering the second portal page according to the second data collection, wherein the second data collection comprises metric data of the second business context.

* * * * *